(12) United States Patent
Nagano (10) Patent No.: US 8,966,199 B2
(45) Date of Patent: Feb. 24, 2015

(54) STORAGE SYSTEM FOR DATA REPLICATION

(75) Inventor: Hiroaki Nagano, Tokyo (JP)

(73) Assignee: NEC Corporation, Tokyo (JP)

( * ) Notice: Subject to any disclaimer, the term of this patent is extended or adjusted under 35 U.S.C. 154(b) by 159 days.

(21) Appl. No.: 13/635,301

(22) PCT Filed: Mar. 7, 2011

(86) PCT No.: PCT/JP2011/001316
§ 371 (c)(1),
(2), (4) Date: Sep. 14, 2012

(87) PCT Pub. No.: WO2011/114648
PCT Pub. Date: Sep. 22, 2011

(65) Prior Publication Data
US 2013/0019077 A1    Jan. 17, 2013

(30) Foreign Application Priority Data

Mar. 17, 2010 (JP) .................................. 2010-060085

(51) Int. Cl.
G06F 13/00 (2006.01)
G06F 3/06 (2006.01)

(52) U.S. Cl.
CPC ............ *G06F 3/0607* (2013.01); *G06F 3/0647* (2013.01); *G06F 3/067* (2013.01)
USPC ........... 711/162; 711/154; 711/165; 707/634; 707/636; 707/652; 707/782; 709/229; 709/232

(58) Field of Classification Search
CPC .......... G06F 3/062; G06F 3/067; G06F 13/10
USPC .................. 711/154, 162, 165; 709/229, 232; 707/634, 636, 652, 782
See application file for complete search history.

(56) References Cited

U.S. PATENT DOCUMENTS

2003/0123274 A1  7/2003  Camble et al.
2003/0135609 A1  7/2003  Carlson et al.
(Continued)

FOREIGN PATENT DOCUMENTS

CN          1761222 A    4/2006
CN        101425948 A    5/2009
(Continued)

OTHER PUBLICATIONS

David A. Daniel et al., "Virtualization of Local Computer Bus Architectures Over the Internet", Proceedings of IEEE GLOBECOM 2007, IEEE, 2007, pp. 1884-1889.
(Continued)

*Primary Examiner* — Reba I Elmore
(74) *Attorney, Agent, or Firm* — Sughrue Mion, PLLC (57) ABSTRACT

A storage system includes a replication source storage device equipped with a replication source storage unit storing replication target data, and a replication destination storage unit which is provided to a replication destination storage device and is a replication destination of the replication target data, which are connected with each other over a network. The replication destination storage unit is equipped with a host bus adapter which is an interface for connecting the replication destination storage unit with the network. Each of the replication source storage device and the host bus adapter provided to the replication destination storage unit is equipped with a connection device which uses the network, located between them, as an extension of a bus of the replication source storage device, and connects the replication source storage device and the host bus adapter provided to the replication destination storage unit with each other.

7 Claims, 6 Drawing Sheets

(56) References Cited

U.S. PATENT DOCUMENTS

| | | |
|---|---|---|
| 2007/0245060 A1 | 10/2007 | Lakkavalli |
| 2007/0294459 A1* | 12/2007 | Chen .............................. 710/315 |
| 2008/0244141 A1 | 10/2008 | Babin |

FOREIGN PATENT DOCUMENTS

| | | |
|---|---|---|
| EP | 1324183 A2 | 7/2003 |
| JP | 1144147 A | 6/1989 |
| JP | 2003-141054 A | 5/2003 |
| JP | 2003-216345 A | 7/2003 |
| WO | 2008053858 A2 | 5/2008 |

OTHER PUBLICATIONS

Office Action dated Sep. 3, 2013 issued by the Japanese Patent Office in counterpart Japanese Application No. 2012505483.

Jun Suzuki et al., "Simultaneous Multi-Host Sharing of I/O with ExpEther Interconnect", Proceedings of the 70th National Convention of IPSJ (1), Architecture, Software Science/Engineering, Database and Media, Japan, Information Processing Society of Japan, Mar. 13, 2008, pp. 1-23-1-24.

Jun Suzkuki et al., "Computer Memory expansion with SSD Attached via Ethernet, Special Interest Group Technical Reports of IPSJ, 2009 5, [CD-ROM]System Software and Operating System (OS)", Information Processing Society of Japan, Japan, Feb. 15, 2020, pp. 1-8.

Hiroshi Kubota, "All About Next-Generation Ethernet Part 2, Easier to Use! Becoming convenient tunnel connecting even storages and boards", Nikkei Network, Japan Nikkei BP, Inc., Jan. 28, 2009, No. 106, p. 025-028.

Communication dated Nov. 25, 2013, issued by the European Patent Office in corresponding Application No. 11755841.1.

Communication dated Jul. 18, 2014, issued by the State Intellectual Property Office of the People's Republic of China in counterpart Application No. 201180014181.8.

* cited by examiner

STORAGE SYSTEM FOR DATA REPLICATION

CROSS REFERENCE TO RELATED APPLICATIONS

This application is a National Stage of International Application No. PCT/JP2011/001316 filed on Mar. 7, 2011, which claims priority from Japanese Patent Application No. 2010-60085, filed on Mar. 17, 2010, the contents of all of which are incorporated herein by reference in their entirety.

TECHNICAL FIELD

The present invention relates to a storage system, and in particular, to a storage system for replicating data stored in a given storage device into another storage device.

BACKGROUND ART

In recent years, along with the development and the spread of computers, various kinds of information are converted into digital data. As a device for storing such digital data, a storage device such as a magnetic disk has been known. However, in preparation for unexpected circumstances such as a failure of the storage device, the data must be replicated and stored in another storage device.

As data replication methods between storage devices, the following methods have been known. One method is to replicate data via a network. In this method, a data transfer path is established between the devices using a protocol such as TCP/IP (Transmission Control Protocol/Internet Protocol) or FC (Fibre Channel) protocol, and data is transferred from the replication source to the replication destination through the path. Patent Document 1 discloses an exemplary system thereof.

Another method is to temporarily move a storage unit such as a HDD (Hard Disk Drive) governed by a transfer destination storage device so as to directly connect it with the transfer source. It is also possible to directly connect them constantly.
Patent Document 1: JP 2003-141054 A

SUMMARY

However, the above-described configuration for implementing data replication causes the following problems. For example, in the former method in which data is replicated via a network, a storage device is required to have a communication function for data transfer in addition to the original functions. As such, the cost for installing the additional function is high and the load at the time of operation is large.

In the latter method in which the storage device is moved so as to be directly connected with the transfer source, it requires effort of an operator who moves the HDD or the like. Further, as the conditions for installation may be constrained in order to realize a constant direct connection, there is a case where a constant direct connection cannot be realized. In particular, as a plurality of storages which are directly connected must be integrally operated practically on a constant basis, if the object of data replication is to protect data by multiple placements of the data, this is not an appropriate method.

As such, an object of the present invention is to solve an increase in the facility cost and an increase in the processing load in a storage system for replicating data, which is the problem to be solved as described above.

In order to achieve the object, a storage system, which is an aspect of the present invention, includes a replication source storage device equipped with a replication source storage unit storing replication target data, and a replication destination storage unit which is provided to a replication destination storage device and is a replication destination of the replication target data, the replication source storage device and the replication destination storage unit being connected with each other over a network.

The replication destination storage unit is equipped with a host bus adapter which is an interface for connecting the replication destination storage unit with the network.

Further, each of the replication source storage device and the host bus adapter provided to the replication destination storage unit is equipped with a connection device, the connection device using the network, located between the replication source storage device and the host bus adapter, as an extension of a bus of the replication source storage device, and connecting the replication source storage device and the host bus adapter provided to the replication destination storage unit with each other.

Further, a program, which is another aspect of the present invention, is a program for causing a replication source storage device of a storage system to realize,
the storage system being configured such that
the replication source storage device equipped with a replication source storage unit storing replication target data, and a replication destination storage unit which is provided to a replication destination storage device and is a replication destination of the replication target data, are connected with each other over a network, that
the replication destination storage unit is equipped with a host bus adapter which is an interface for connecting the replication destination storage unit with the network, and that
each of the replication source storage device and the host bus adapter provided to the replication destination storage unit is equipped with a connection device, the connection device using the network, located between the replication source storage device and the host bus adapter, as an extension of a bus of the replication source storage device, and connecting the replication source storage device and the host bus adapter provided to the replication destination storage unit with each other,
a connection control means for establishing a connection between the connection devices, and performing control to connect the replication destination storage unit with the extension of the bus of the replication source storage device via the host bus adapter.

Further, an information processing method, which is another aspect of the present invention, is a method in a storage system in which
a replication source storage device equipped with a replication source storage unit storing replication target data, and a replication destination storage unit which is provided to a replication destination storage device and is a replication destination of the replication target data, are connected with each other over a network,
the replication destination storage unit is equipped with a host bus adapter which is an interface for connecting the replication destination storage unit with the network, and
each of the replication source storage device and the host bus adapter provided to the replication destination storage unit is equipped with a connection device, the connection device using the network, located between the replication source storage device and the host bus adapter, as an extension of a bus of the replication source storage device, and connecting the replication source storage device and the host bus adapter provided to the replication destination storage unit with each other, the method comprising by the replication source storage device, establishing a connection between the connection devices, and performing control to connect the replication destination storage unit with the extension of the bus of the replication source storage device via the host bus adapter.

With the above-described configuration, the present invention is able to reduce the facility cost and the processing load of a storage system for replicating data.

EXEMPLARY EMBODIMENTS

First Exemplary Embodiment

Figure 1:
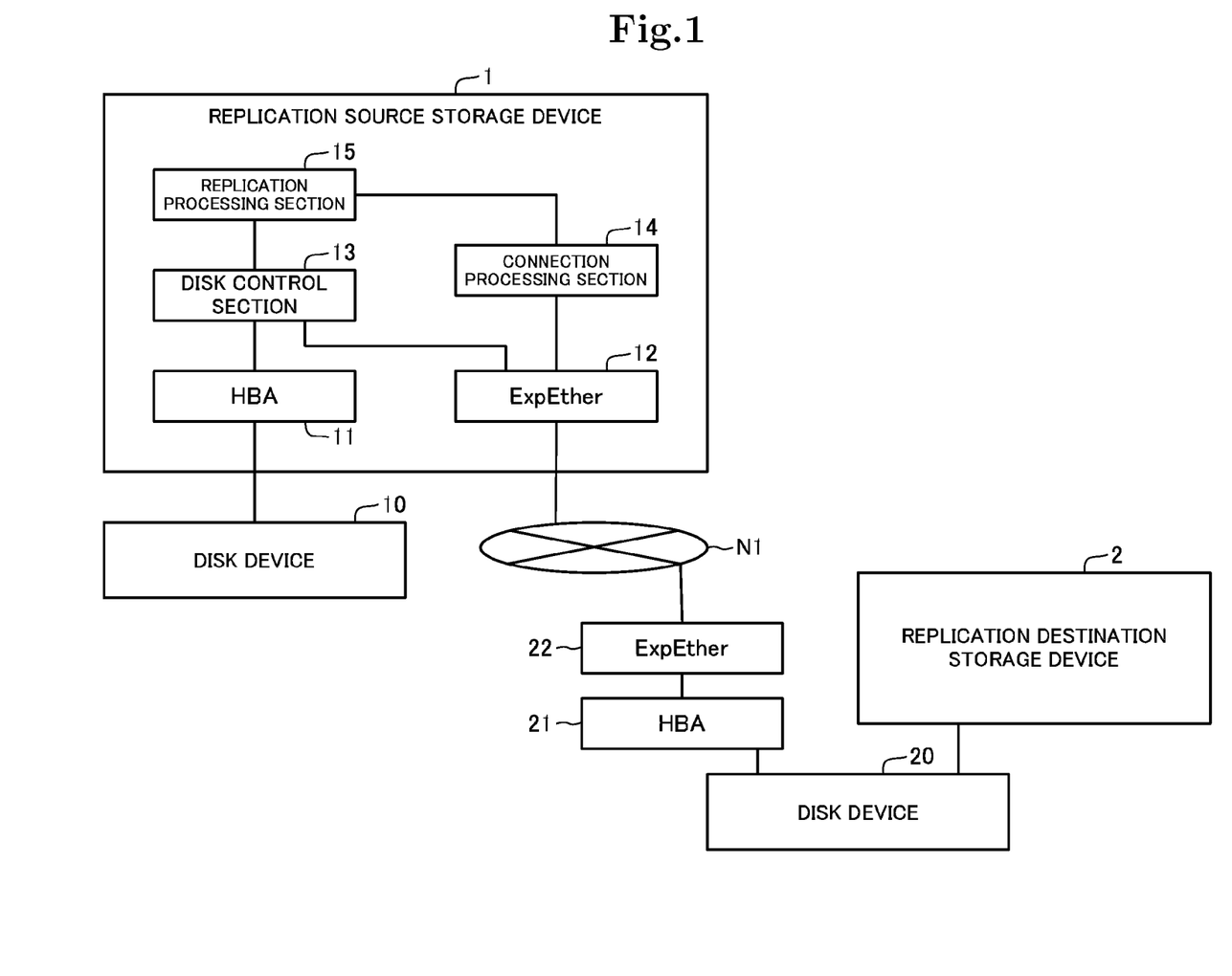
FIG. 1 is a functional block diagram showing the configuration of a storage system according to a first exemplary embodiment of the present invention.
Figure 2:
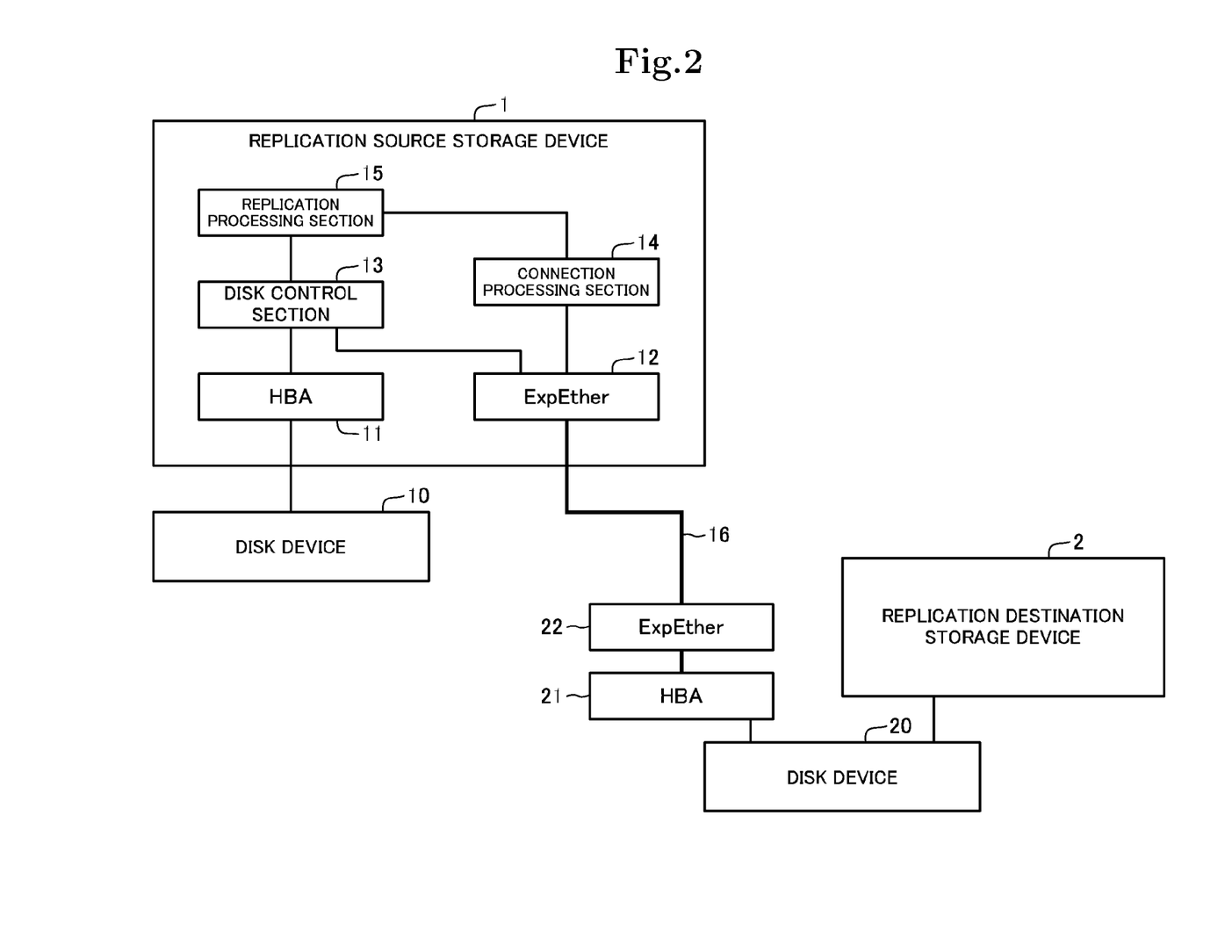
FIG. 2 is an illustration showing a state of an operation of the storage system according to the first exemplary embodiment of the present invention.
Figure 3:
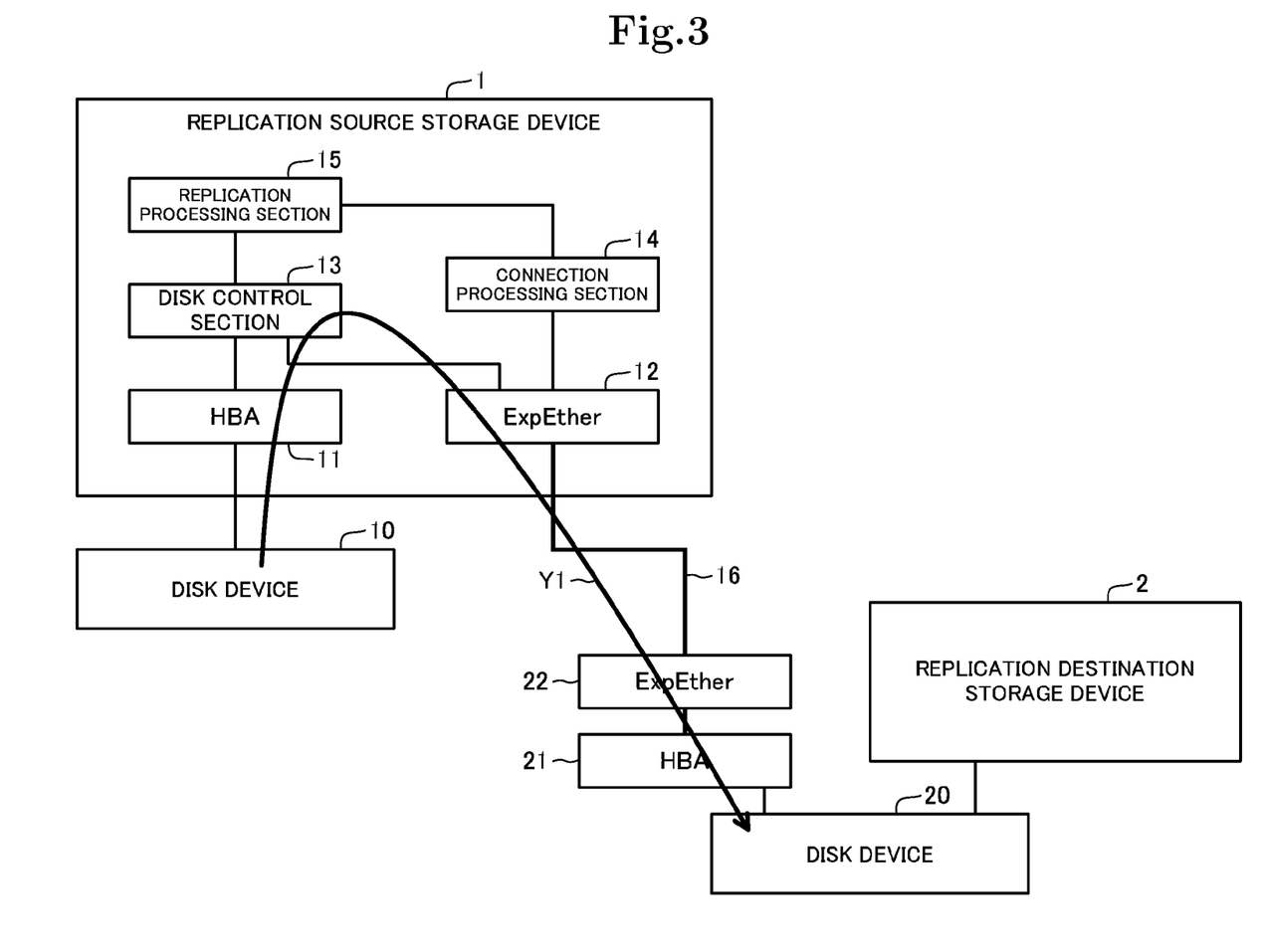
FIG. 3 is an illustration showing a state of an operation of the storage system according to the first exemplary embodiment of the present invention.
Figure 4:
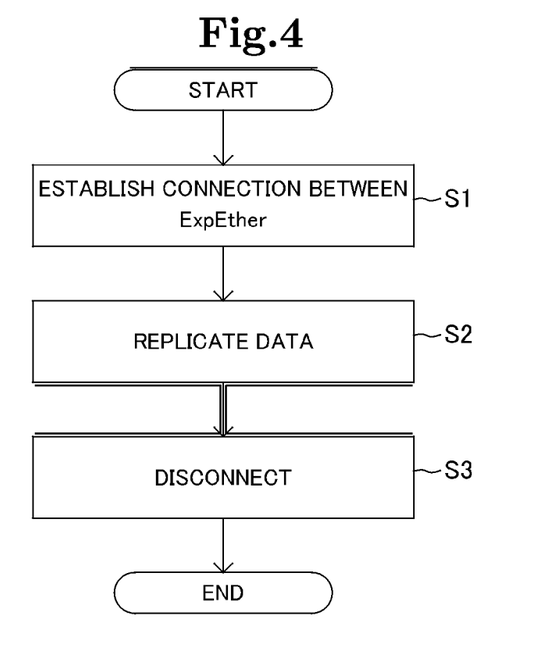
FIG. 4 is a flowchart showing the operation of the storage system according to the first exemplary embodiment of the present invention.

A storage system according to a first exemplary embodiment of the present invention will be described with reference to FIGS. 1 to 4. FIG. 1 is a functional block diagram showing the configuration of the storage system. FIGS. 2 and 3 are illustrations showing a state of an operation of the storage system, and FIG. 4 is a flowchart showing the operation of the storage system.

[Configuration]

As shown in FIG. 1, the storage system according to the present embodiment is configured such that a replication source storage device 1 and a replication destination storage device 2 are connected over a network N1 such as a LAN (Local Area Network), the Internet, or the like. Specifically, the replication source storage device 1 is connected with a disk device 20 provided to the replication destination storage device 2, via ExpEther devices 12 and 22 and a HBA (host bus adapter) 21 described below. In the present embodiment, description will be given based on the premise that the network N1 connecting the replication source storage device 1 and the replication destination storage device 2 is a LAN conforming the Ethernet standards. Hereinafter, the respective configurations will be described.

First, the replication destination storage device 2 will be described. The replication destination storage device 2 is a storage device including an arithmetic unit and a memory unit. The replication destination storage device 2 is equipped with the disk device 20 (replication destination storage unit) which stores various kinds of data, in a direct connection. It should be noted that while the disk device 20 is capable of storing data in accordance with instructions from the replication destination storage device 2, the disk device 20 is handled as if it is directly connected with the replication source storage device 1, and also serves as a replication destination of replication target data stored in the replication source storage device 1, as described below.

Further, the disk device 20, connected with the replication destination storage device 2, is connected with the HBA (host bus adapter) 21 which is an interface board to be used for accessing using SAS (Serial Attached SCSI (Small Computer System Interface)), FC (Fibre Channel), or the like. Further, the HBA 21 is connected with the ExpEther device 22 (connection device), and is connected with the ExpEther device 12 on the side of the replication source storage device 1, described below, over the network N1. The ExpEther device 22 will be described below.

Next, the replication source storage device 1 will be described. The replication source storage device 1 is a storage device including an arithmetic unit and a memory unit. The replication source storage device 1 is equipped with a HBA (host bus adapter) 11 which is an interface board to be used for accessing using SAS (Serial Attached SCSI (Small Computer System Interface)), FC (Fibre Channel), or the like. The replication source storage device 1 is equipped with a disk device 10 (replication source storage unit) which stores various kinds of accessible data via the HBA 11, in a direct connection.

The replication source storage device 1 is also equipped with the ExpEther device 12 (connection device) which is an interface board for controlling a disk device or the like governed by another storage device via the network N1 as if it is directly connected with the self device (replication source storage device 1), using the ExpEther (Express Ether) technology. Specifically, the ExpEther device 12 has a function of handling, for example, an I/O board having a PCI Express interface remotely located over the Ethernet as if it is directly connected with a PCI Express bus which is a bus of the self device (replication source storage device 1). As such, the ExpEther device 12 of the present embodiment is capable of handing the network N1, located between it and the ExpEther device 22 on the side of the replication destination storage device 2 connected over the network N1, as an extension of the bus of the replication source storage device 1, and handling the disk device 20 on the side of the replication destination storage device 2 as if it is directly connected with the replication source storage device 1 virtually.

The replication source storage device 1 includes a disk control section 13, a connection processing section 14, and a replication processing section 15, which are constructed by a program installed in the arithmetic unit.

The disk control section 13 controls writing and reading of data to/from the disk device 10.

The connection processing section 14 (connection control means) instructs the ExpEther device 12 to connect to the ExpEther device 22 governing the HBA 21 connected with the disk device 20 on the side of the replication destination storage device 2. Then, the connection processing section 14 drives the ExpEther device 12 so as to control to establish a connection with the ExpEther 22 on the side of the replication destination storage device 2. At this moment, the ExpEther device 12 provides an interface in which the HBA 21 governed by the disk device 20 on the side of the replication destination storage device 2 is handled as if it is directly connected with the PCI Express bus which is the bus of the replication source storage device 1. Thereby, the disk control section 13 is able to access the disk device 20 on the replication destination storage device 2 as directly-connected peripheral equipment, which is the same as the case of the disk device 10 directly connected via the HBA 11.

It should be noted that when the connection processing section 14 establishes a connection with the remotely-located host bus adapter 21 via the ExpEther devices 12 and 22 as described above, the replication source storage device 1, which is the self device, is able to connect or disconnect it, similar to the case of automatically connecting/disconnecting directly connected devices with the Hot Plug function.

Here, the ExpEther technology which handles the network N1 as an extension of the bus of the replication source storage device 1 between the ExpEther devices 12 and 22 will be described. In the ExpEther technology, a particular header is added to data exchanged between the ExpEther devices 12 and 22 and the data is encapsulated, whereby it is possible to provide an interface in which a remotely-located device such as a storage device is handled as if it is directly connected. It should be noted that as the ExpEther technology is well known, the detailed description thereof is not provided herein.

Further, the replication processing section 15 (replication means) transmits replication target data stored in the disk device 10 governed by the replication source storage device 1, to the disk device 20 governed by the replication destination storage device 2 connected with the extension of the bus of the replication source storage device 1, and controls to replicate and store the replication target data.

[Operation]

Next, in the above-described storage system, an operation of replicating replication target data, stored in the disk device 10 of the replication source storage device 1, into the disk device 20 of the replication destination storage device 2 will be described with reference to FIGS. 1 to 4.

First, the replication processing section 15 instructs the connection processing section 14 to establish a connection with the ExpEther device 22 governing the HBA 21 connected with the disk device 20 on the side of the replication destination storage device 2. Upon reception of the instruction, the connection processing section 14 drives the ExpEther device 12 to establish a connection with the ExpEther device 22 connected over the network N1 (step S1 in FIG. 4). At this point, the ExpEther device 12 provides the replication source storage device 1 with an interface in which the HBA 21 on the side of the replication destination storage device 2 is handled as if it is directly connected with the PCI Express bus (see a reference numeral 16 in FIG. 2). Thereby, the disk control section 13 is able to access the disk device 20 on the side of the replication destination storage device 2 as if it is directly connected, similar to the case of the disk device 10 which is directly connected via the HBA 11.

Then, the replication processing section 15 replicates the replication target data from the disk device 10 of the replication source storage device 1 into a replication destination region in the disk device 20 of the replication destination storage device 2 (see an arrow Y1 in FIG. 3, step S2 in FIG. 4). It should be noted that while the replication destination region in the disk device 20 may be exclusively controlled between the replication destination storage device 2 and the replication source storage device 1, the detailed description thereof is not provided in the present embodiment.

After the replication of the replication target data has been completed as described above, the replication processing section 15 instructs the connection processing section 14 to disconnect. Thereby, the connection between the ExpEther devices 12 and 22 is disconnected (step S3 in FIG. 4), and the state where the disk device 20 on the side of the replication destination storage device 2 is directly connected with the replication source storage device 1 is released.

As described above, according to the storage system of the present invention, the replication destination storage device 2 is not involved in data transfer processing. Further, the processing performed in the replication source storage device 1 is mere copying of data between the devices, and network protocol processing or the like is not required at all. Accordingly, it is possible to largely reduce the operation cost for replication processing, and also reduce the processing load in the entire storage system.

Further, as the connection processing section 14 described above is activated at the time of copying and is realized by only adding processing corresponding to hot plug for directly connecting the device, the installation cost can be reduced significantly.

Furthermore, as the devices are connected over a network by means of ExpEther devices while the replication processing is simplified to a level similar to that performed between directly-connected devices, a large freedom can be realized in the physical arrangements between the replication devices.

Second Exemplary Embodiment

Figure 5:
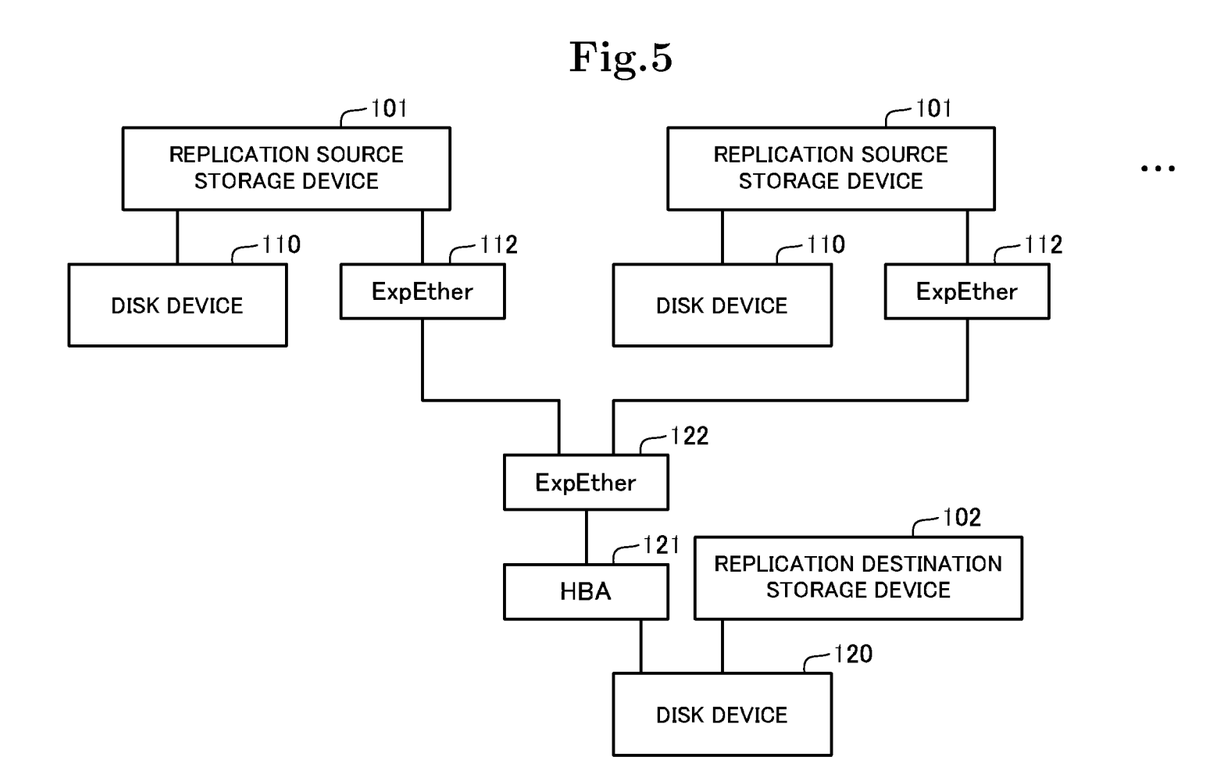
FIG. 5 is a functional block diagram showing the configuration of a storage system according to a second exemplary embodiment of the present invention.

Next, a second exemplary embodiment of the present invention will be described with reference to FIG. 5. FIG. 5 is a functional block diagram showing the configuration of a storage system according to the present embodiment.

The storage system of the present embodiment is configured such that a plurality of replication source storage devices 101 are connected with a particular replication destination storage device 102. In the example shown in FIG. 5, each of the replication source storage devices 101 having a disk device 110 is equipped with an ExpEther device 112, and the ExpEther device 112 is connected with an ExpEther device 122 governing an HBA 121 connected with a disk device 120 provided to the replication destination storage device 102, over a network. It should be noted that the replication source storage device 101, the replication destination storage device 102, the ExpEther devices 112 and 122, and the like have configurations almost similar to those described in the first exemplary embodiment.

The ExpEther device 122 on the side of the replication destination storage device 102 is able to accept a connection from the ExpEther devices 112 on the side of any replication source storage devices 101. This means that the disk device 120 on the side of the replication destination storage device 102 may be in a state of being directly connected with a plurality of the replication source storage devices 101.

In that state, the disk device 120 on the side of the replication destination storage device 102 may be used under exclusive control between the replication source storage devices 101. Meanwhile, if the ExpEther device 122 and the HBA 121 on the side of the replication destination storage device 102 have a multi-route supporting function, the disk device 120 may be used simultaneously.

Thereby, replication from the replication source storage devices 101 can be performed on the disk device 120 on the side of the replication destination storage device 102 in a directly-connected state.

It should be noted that a direction of replication may be in an opposite direction from the above-described direction. As such, data stored in the disk device 120 on the side of the replication destination storage device 102 may be replicated and stored in a plurality of the disk devices 110 on the side of the replication source storage devices 101.

Further, configurations similar to the ExpEther device 122 and the HBA 121 provided to the disk device 120 on the side of the replication destination storage device 102 may be provided to the disk device 110 on the side of the replication source storage device 101. Thereby, the respective storage devices 101 and 102 can perform replication processing with each other.

As described above, the storage system described in each of the above exemplary embodiments is applicable to use in fast data replication, data movement, and the like. Further, it is also applicable to use in backup by sharing a tape drive by the same method.

<Supplementary Notes>

The whole or part of the exemplary embodiments disclosed above can be described as, but not limited to, the following supplementary notes. Hereinafter, the schematic configuration of a storage system according to the present invention will be described with reference to FIG. 6. Further, the configurations of a program and an information processing method according to the present invention will be described. However, the present invention is not limited to the configurations described below.

(Supplementary Note 1)

Figure 6:
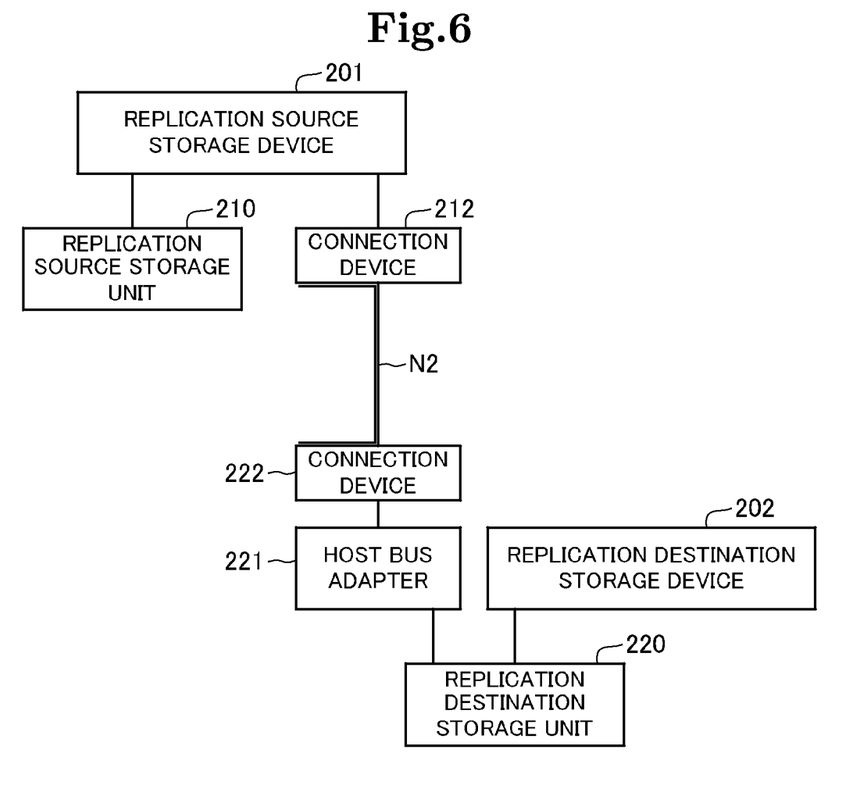
FIG. 6 is a functional block diagram showing the configuration of a storage system according to supplementary note 1 of the present invention.

A storage system comprising, a replication source storage device 201 equipped with a replication source storage unit 210 storing replication target data, and a replication destination storage unit 220 which is provided to a replication destination storage device 202 and is a replication destination of the replication target data, the replication source storage device and the replication destination storage unit being connected with each other over a network N2, wherein the replication destination storage unit 220 is equipped with a host bus adapter 221 which is an interface for connecting the replication destination storage unit 220 with the network N2, and the replication source storage device 201 and the host bus adapter 221 provided to the replication destination storage unit 220 are equipped with connection devices 212 and 222 respectively, the connection devices 212 and 222 using the network N2, located between the replication source storage device 201 and the host bus adapter 221, as an extension of a bus of the replication source storage device 201, and connecting the replication source storage device 201 and the host bus adapter 221 provided to the replication destination storage unit 220 with each other.

(Supplementary Note 2)

The storage system according to supplementary note 1, wherein the replication source storage device includes a connection control means for establishing a connection between the connection devices, and performing control to connect the replication destination storage unit with the extension of the bus of the replication source storage device via the host bus adapter.

(Supplementary Note 3)

The storage system according to supplementary note 2, wherein the replication source storage device includes a replication means for transmitting the replication target data, stored in the replication source storage unit, to the replication destination storage unit with which the connection is established by the connection control means, replicating the replication target data, and storing replicated data in the replication destination storage unit.

(Supplementary Note 4)

The storage system according to any of supplementary notes 1 to 3, wherein the connection device on the side of the replication destination storage unit is able to establish a connection with each of the connection devices provided to a plurality of the replication source storage devices.

(Supplementary Note 5)

The storage system according to any of supplementary notes 1 to 4, wherein the connection device is an ExpEther device, and the network is the Ethernet.

(Supplementary Note 6)

A program for causing a replication source storage device of a storage system to realize, the storage system being configured such that the replication source storage device equipped with a replication source storage unit storing replication target data, and a replication destination storage unit which is provided to a replication destination storage device and is a replication destination of the replication target data, are connected with each other over a network, that the replication destination storage unit is equipped with a host bus adapter which is an interface for connecting the replication destination storage unit to the network, and that each of the replication source storage device and the host bus adapter provided to the replication destination storage unit is equipped with a connection device, the connection device using the network, located between the replication source storage device and the host bus adapter, as an extension of a bus of the replication source storage device, and connecting the replication source storage device and the host bus adapter provided to the replication destination storage unit with each other, a connection control means for establishing a connection between the connection devices, and performing control to connect the replication destination storage unit with the extension of the bus of the replication source storage device via the host bus adapter.

(Supplementary Note 7)

The program according to supplementary note 6, further causing the replication source storage device to realize a replication means for transmitting the replication target data stored in the replication source storage unit to the replication destination storage unit with which the connection is established by the connection control means, replicating the replication target data, and storing replicated data in the replication destination storage unit.

(Supplementary Note 8)

An information processing method in a storage system in which a replication source storage device equipped with a replication source storage unit storing replication target data, and a replication destination storage unit which is provided to a replication destination storage device and is a replication destination of the replication target data, are connected with each other over a network, the replication destination storage unit is equipped with a host bus adapter which is an interface for connecting the replication destination storage unit with the network, and each of the replication source storage device and the host bus adapter provided to the replication destination storage unit is equipped with a connection device, the connection device using the network, located between the replication source storage device and the host bus adapter, as an extension of a bus of the replication source storage device, and connecting the replication source storage device and the host bus adapter provided to the replication destination storage unit with each other, the method comprising by the replication source storage device, establishing a connection between the connection devices, and performing control to connect the replication destination storage unit with the extension of the bus of the replication source storage device via the host bus adapter.

(Supplementary Note 9)

The information processing method according to supplementary note 8, wherein the method of controlling the connection includes by the replication source storage device, transmitting the replication target data stored in the replication source storage unit to the replication destination storage unit in which the connection is established with the extension of the bus of the replication source storage device, replicating the replication target data, and storing replicated data in the replication destination storage unit.

While the present invention has been described with reference to the exemplary embodiments thereof, the present invention is not limited to those embodiments described above. It will be understood by those skilled in the art that various changes in form and details may be made therein within the scope of the present invention.

This application is based upon and claims the benefit of priority from Japanese patent application No. 2010-60085, filed on Mar. 17, 2010, the disclosure of which is incorporated herein in its entirety by reference.

REFERENCE NUMERALS 1 replication source storage device
2 replication destination storage device
10 disk device
11 HBA
12 ExpEther device
13 disk control section
14 connection processing section
15 replication processing section
20 disk device
21 HBA
22 ExpEther device
101 replication source storage device
102 replication destination storage device
110,120 disk device
120 disk device
201 replication source storage device
202 replication destination storage device
210 replication source storage unit
212,222 connection device
220 replication destination storage unit
221 host bus adapter
N1, N2 network

The invention claimed is:

1. A storage system comprising:
a replication source storage device comprising a replication source storage unit which is configured to store replication target data, and a replication destination storage unit which is configured to be governed by a replication destination storage device and is a replication destination of the replication target data, the replication source storage device and the replication destination storage unit being connected with each other over an Ethernet network, wherein the replication destination storage unit comprising a host bus adapter which is configured to provide an interface for connecting the replication destination storage unit with the network, the host bust adapter being configured to be governed by the replication destination storage unit, and each of the replication source storage device and the host bus adapter are equipped with an ExpEther connection device, the ExpEther connection device using the Ethernet network, located between the replication source storage device and the host bus adapter, as an extension of a bus of the replication source storage device, and directly connecting the replication source storage device and the host bus adapter with each other, wherein the replication source storage device includes a connection control unit configured to establish a connection between ExpEther devices, and to perform control to connect the replication destination storage unit with the extension of the bus of the replication source storage device via the host bus adapter.

2. The storage system according to claim 1, wherein
the replication source storage device includes a replication unit that transmits the replication target data, stored in the replication source storage unit, to the replication destination storage unit with which the connection is established by the connection control unit, replicates the replication target data, and stores replicated data in the replication destination storage unit.

3. The storage system according to claim 1, wherein
the connection device on a side of the replication destination storage unit is able to establish a connection with each ExpEther connection device provided to a plurality of the replication source storage devices.

4. A non-transitory computer-readable medium storing a program comprising instructions for causing a replication source storage device of a storage system to realize,
the storage system being configured such that:
the replication source storage device comprises a replication source storage unit which is configured to store replication target data, and a replication destination storage unit which is configured to be governed by a replication destination storage device and is a replication destination of the replication target data, are connected with each other over an Ethernet network, that the replication destination storage unit comprises a host bus adapter which is configured to provide an interface for connecting the replication destination storage unit with the network, the host bus adapter being configured to be governed by the replication destination storage unit, and that each of the replication source storage device and the host bus adapter are equipped with an ExpEther connection device, the ExpEther connection device using the Ethernet network, located between the replication source storage device and the host bus adapter, as an extension of a bus of the replication source storage device, and directly connecting the replication source storage device and the host bus adapter with each other, wherein the replication source storage device comprises a connection control unit configured to establish a connection between ExpEther connection devices, and to perform control to connect the replication destination storage unit with the extension of the bus of the replication source storage device via the host bus adapter.

5. The non-transitory computer-readable medium storing the program according to claim 4, further causing the replication source storage device to realize
a replication unit that transmits the replication target data stored in the replication source storage unit to the replication destination storage unit with which the connection is established by the connection control unit, replicates the replication target data, and stores replicated data in the replication destination storage unit.

6. An information processing method in a storage system in which
a replication source storage device comprises a replication source storage unit which is configured to store replication target data, and a replication destination storage unit which is configured to be governed by a replication destination storage device and is a replication destination of the replication target data, are connected with each other over an Ethernet network,
the replication destination storage unit comprises a host bus adapter which is configured to provide an interface for connecting the replication destination storage unit with the network, the host bus adapter being configured to be governed by the replica destination storage unit, and
each of the replication source storage device and the host bus adapter are equipped with an ExpEther connection device, the ExpEther connection device using the Ethernet network, located between the replication source storage device and the host bus adapter, as an extension of a bus of the replication source storage device, and directly connecting the replication source storage device and the host bus adapter with each other,
the replication source storage device establishing a connection between ExpEther connection devices using a connection control unit of the replication source storage device, and performing control to connect the replication destination storage unit with the extension of the bus of the replication source storage device via the host bus adapter.

7. The information processing method according to claim 6, further comprising
the replication source storage device transmitting the replication target data stored in the replication source storage unit to the replication destination storage unit in which the connection is established with the extension of the bus of the replication source storage device, replicating the replication target data, and storing replicated data in the replication destination storage unit.

* * * * *

UNITED STATES PATENT AND TRADEMARK OFFICE
CERTIFICATE OF CORRECTION

Page 1 of 1

PATENT NO. : 8,966,199 B2
APPLICATION NO. : 13/635301
DATED : February 24, 2015
INVENTOR(S) : Hiroaki Nagano It is certified that error appears in the above-identified patent and that said Letters Patent is hereby corrected as shown below:

IN THE CLAIMS

Column 11, Line 24: In Claim 6, delete "replica" and insert -- replication --

Signed and Sealed this
Twenty-second Day of December, 2015

Michelle K. Lee
*Director of the United States Patent and Trademark Office*